March 12, 1957  G. L. ATKINSON  2,785,254
CIRCUIT INTERRUPTING DEVICE
Filed May 4, 1954  5 Sheets-Sheet 1
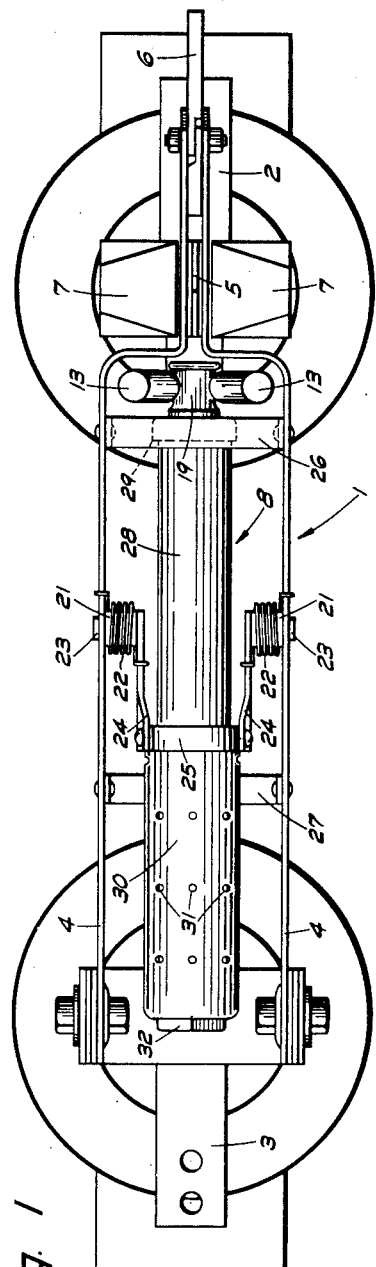
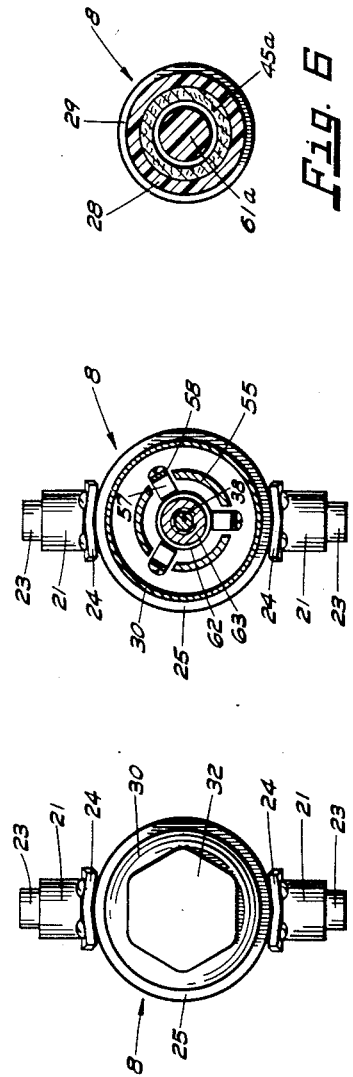
INVENTOR.
Gerald L. Atkinson
BY
Attorney March 12, 1957 G. L. ATKINSON 2,785,254
CIRCUIT INTERRUPTING DEVICE
Filed May 4, 1954 5 Sheets-Sheet 2

INVENTOR.
Gerald L. Atkinson
BY
Attorney

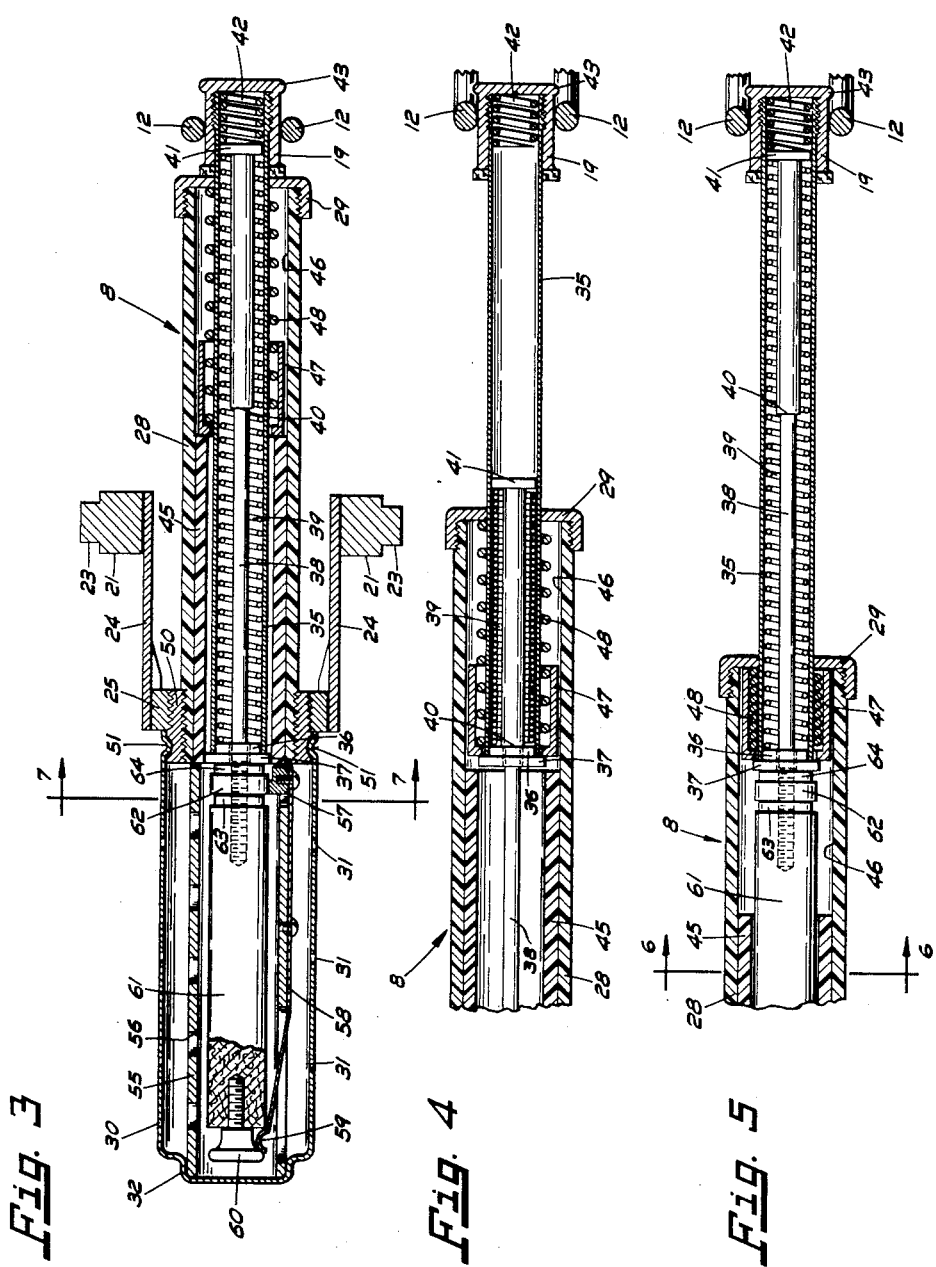

March 12, 1957  G. L. ATKINSON  2,785,254
CIRCUIT INTERRUPTING DEVICE
Filed May 4, 1954  5 Sheets-Sheet 4

INVENTOR.
Gerald L. Atkinson
BY
Arnold J. Ericsen
Attorney

INVENTOR.
Gerald L. Atkinson
BY
Attorney

United States Patent Office 2,785,254
Patented Mar. 12, 1957

2,785,254

CIRCUIT INTERRUPTING DEVICE

Gerald L. Atkinson, Milwaukee, Wis., assignor to McGraw Electric Company, Milwaukee, Wis., a corporation of Delaware Application May 4, 1954, Serial No. 427,557

12 Claims. (Cl. 200—146)

The present invention relates to circuit interrupting devices, and pertains particularly to an auxiliary loadbreak interrupter unit adaptable for use with conventional circuit making and breaking devices.

Prior loadbreak units have not been entirely acceptable for various reasons, which include the fact that the arcing contacts are often not reset until after electrical engagement of the main circuit maker components, which does not give the desired performance for closing in on capacitor inrush currents, fault currents, and the like; or, that the units have utilized complicated resetting mechanisms with component parts being exposed to the atmosphere; in addition to the fact that the arcing contacts have been urged towards separation by biasing means, such as springs that are normally under tension or compressive load conditions until just prior to separation. Inasmuch as these units are placed in operation only occasionally, the spring means tends to acquire a permanent set after a length of time losing a considerable amount of its effectiveness. Many of the prior devices also utilized such complicated resetting and operating mechanisms, that the various component electrically conducting parts shortened the effective flashover distance between the main terminal members.

It is an object of the present invention to provide a load interrupting unit which is entirely self-contained, and which is adapted for mounting on conventional circuit making and breaking devices, such as disconnect switches or fuse cutouts, and which unit may be electrically connected in shunt relationship with the main circuit device to momentarily accept the full load current during disconnect operation, subsequently interrupting that current within the confines of the self-contained unit, whereby any arcs created on interruption may be confined to and properly extinguished within the chamber of the said load interrupter unit.

It is another object of the present invention to provide an auxiliary loadbreak unit for an electrical circuit maker or breaker device which is entirely self-contained, which is fully automatic in operation and resetting, and which unit comprises arcing contacts operating in an arc-extinguishing medium and being actuated towards operation and resetting by biasing means loaded for operation immediately prior to release of the contacts and/or resetting of these contacts, which biasing means are normally maintained in an inactive or unloaded condition within the confines of the unit.

It is a specific object of the present invention to provide an auxiliary loadbreak unit for an electrical circuit maker or breaker, which unit may be adapted for use with any of the conventional devices with very little modification required, and which unit includes a movable arcing contact normally electrically engaged with a stationary contact, said contacts being positioned in an arc-extinguishing medium, with the movable arcing contact being actuated towards movement from a normally retained position to provide a relatively quick release action on continued opening of the main circuit connecting device, and which contacts are reset to normal operating position on continued movement of the main circuit maker or breaker device without requiring special resetting mechanism involving complicated linkage mechanisms.

Further objects of the present invention will become apparent from the following description taken in connection with the drawings, in which:

Fig. 1 is a plan view of a disconnect switch in circuit closed position, having mounted thereon the improved loadbreak unit.

Fig. 3 is a longitudinal sectional view of the loadbreak interrupter unit with its component parts in normal operating position to provide a parallel electrical circuit with the circuit maker or breaker on which it is mounted.

Fig. 4 is a fragmentary sectional view of the interrupter unit with the components thereof positioned as shown with respect to Fig. 2.

Fig. 5 is a fragmentary sectional view of the interrupter unit after the arcing contacts have been separated, but with the reset spring biasing means in loaded or stressed position just prior to release of the actuator mechanism from the upper auxiliary contact spring, which action resets the interrupter unit.

Fig. 6 is a sectional view taken approximately at lines 6—6 of Fig. 5 showing a modification of the component parts.

Fig. 7 is a cross-sectional view taken on lines 7—7 of Fig. 3.

Fig. 8 is a bottom view of the loadbreak unit taken on lines 8—8 of Fig. 2.

Throughout the various views like parts are denoted with like reference characters.

Figure 2:
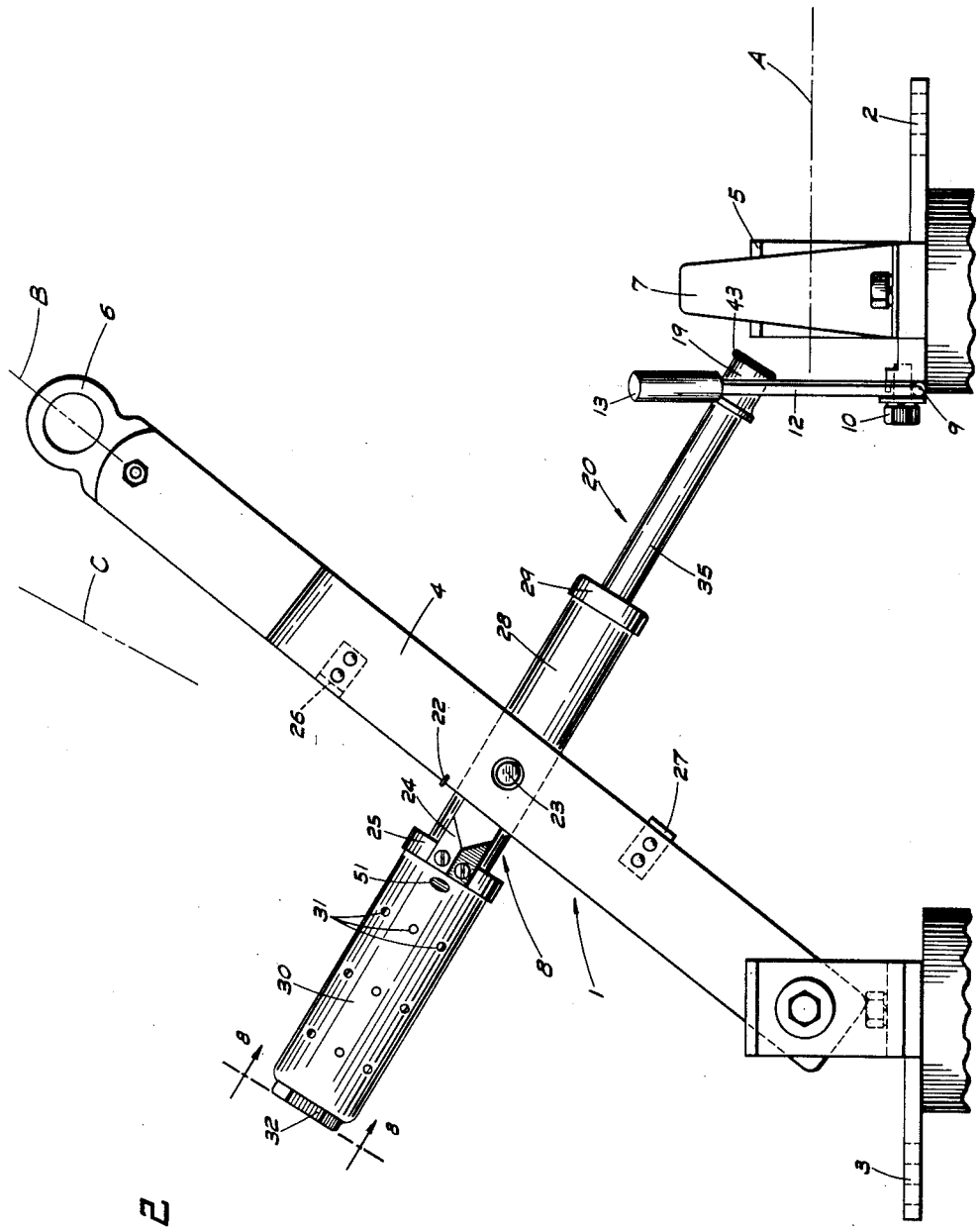
Fig. 2 is a side elevational view of the disconnect switch having its main contact blades fully separated from the main terminal contacts, but with the auxiliary, or parallel circuit, remaining closed through the loadbreak unit, and with the component parts of the unit in position immediately prior to release of the auxiliary arcing contacts.

The loadbreak unit is preferably described in connection with its use as an auxiliary interrupter means for a conventional circuit maker or breaker, such as a disconnect switch, as shown in Figs. 1 and 2. The switch is indicated generally by the reference character 1, and comprises spaced stationary terminals 2 and 3, respectively. Connection with an electrical line is made in the conventional manner at these terminals (not shown). Electrical connection between the terminals is made by means of a pair of pivoted switch blades 4, having a positive latching means 5 actuated towards latching or release position by a pivoted manipulating eyelet 6. The eyelet is adapted to receive the projection on a conventional switch stick (not shown) during opening and closing operation. The jaw type contact 7, which is positioned at the terminal 2, is adapted to electrically engage the blades 4 during normally closed electrical circuit condition, as shown in Fig. 1.

Inasmuch as the loadbreak unit, shown generally by the reference character 8, is entirely self-contained and comprises only two separable portions, it will be readily appreciated that the separable parts are the only members that need be mounted on conventional switches with little or no modification being required of the main switch structure. Although the unit is shown mounted between spaced switch blades, it will be obvious that it may be mounted on a single-bladed switch from a single laterally extending pivot member (not shown).

Referring to Figs. 1 and 2, it will be seen that one portion of the loadbreak unit 8 comprises an auxiliary conducting contact spring 9 extending laterally of the terminal contact 7. The contact spring may be mounted on the switch terminal by means of conventional mounting bolts 10 fastened thereto. The contact spring 9 is of a general U-shaped and has outwardly projecting contact arms 12. The outer portion of the contact arms are each preferably bent away from one another, as shown, to provide entrance for graspingly engaging the conducting contact knob 19 of the actuator, denoted generally at 20, of the auxiliary interrupter unit 8. The free ends of the contact arms 12 are also preferably fitted with cap members 13 for a purpose which will hereinafter be described.

The loadbreak unit may be suitably pivoted from the switch blades by means of the spaced, laterally extending conducting shafts 21 electrically engaging each switch blade 4. The shafts are each shouldered to provide a mandrel for the torsion spring 22, and each terminate at the outer end in a reduced diameter. The reduced ends 23 project through openings in the switch blades 4 and act as bearing surfaces for the pivoted loadbreak unit 8. The shafts 21 engage supporting arm members 24 spaced at either side of the loadbreak unit, and are integral with a conducting ferrule 25. The torsion springs 22 are provided to urge the interrupter unit towards movement in a counterclockwise direction, as viewed in Fig. 2. Thus the unit is normally positioned in seating engagement with the opposed cradle members 26 and 27 extending between the spaced blade members 4.

The housing for the self-contained loadbreak unit comprises an insulating tube 28, which may be of Bakelite, or similar material. The tube is closed at both ends by means of a threaded cap member 29 and a vented lower cap member 30 threadingly engaging the insulating tube for ease in removal. The member 30 is vented at the various spaced openings 31 for purposes hereinafter described. The lower end of the cap member is preferably provided with a hexagonal portion 32 for receiving a cup-like fitting attached to a hook stick. Thus, the fitting (not shown) may be used to grasp the housing for removing the same as an entire unit from the switch 1. Thus, inspection may be made, and for that matter, entire interrupter components may be removed and replaced without disturbing the switch unit, and with a ready access from the open end of the switch 1.

The auxiliary interrupter unit 8 is normally in parallel circuit relationship with the main switch blades 4, as shown in Fig. 1. The various component parts of this loadbreak unit may be best described with reference to Fig. 3, wherein the parts are in normal circuit closed relationship, and comprise an actuator portion, shown generally by the reference character 20 and terminating in the conducting contact knob 19 which threadingly engages one end of a conducting tubular member 35. This threading engagement provides ready access to the component members positioned within the confines of the tube 35. The conducting tube terminates at its opposite end in a shoulder closure member 36. The outwardly extending shoulder portion provides a flange 37 for purposes hereinafter described. The closure member 36 slidably receives a conducting plunger rod 38 having circumjacent therewith a normally unloaded compression spring 39. The rod is preferably shouldered at 40 to provide a stop for engaging the closure member 36 on the tube 35. The rod terminates at one end in a flanged portion 41 slidably received by the tube.

The contact knob 19 is provided with a chamber for receiving the flanged portion 41 of the plunger rod, and a cushioning coil spring 42. This spring acts as a recoil cushion engaging the flanged portion 41 of the rod 38 during operation thereof, as will hereinafter be described. The contact knob is provided with a flanged portion 43 at its extremity acting as a stop engageable with the embracing contact arms 12. The insulating tube 28 is preferably provided with a tubular liner 45 which is of arc-extinguishing material, such as Lucite, which is the trade name for methyl methacrylate. Although this is the preferred material, it will be understood that various materials capable of extinguishing, or at least, cooling and distending electrical arcs, may be substituted therefore. The bore 46 of the insulating tube 28 is enlarged relative to the internal diameter of the liner 45 in order to slidably receive a resetting hammer member 47. The hammer normally rests at the upper portion of the liner 45 and is provided with a chamber for receiving a normally unloaded compression reset spring 48, which spring abuts the cap 29 at its opposite end. The hammer 47 also slidably receives the tube 35 and is adapted to engage the flanged portion 37 of the closure member 36, as will be later described.

It is to be noted that the ferrule 25 is preferably threadingly engaged with a conducting collar 50 to provide for ready removal of the entire unit from the switch 1. The collar 50 is also preferably threaded to engage the insulating tube 28 and is rigidly fastened to the lower vented cap member 30 by means of circumferentially spaced indentations 51.

The lower vented cap member 30 is conducting and is adapted to receive and engage, at its lower end, with a conducting vented cylindrical muffler 55 provided with circumferentially and longitudinally spaced vent openings 56. The upper, or opposite end, of the muffler 55 is provided with a plurality of radially spaced openings for slidably receiving stationary arcing contacts 57. As shown in Fig. 7, it is desirable to provide at least three stationary contacts 57. The muffler is also slotted at its opposite end to receive resilient leaf springs 58, which may be fastened intermediate the ends thereof to the muffler, as shown in Fig. 3 by means of conventional screws. The leaf springs 58 are formed at one end with a hump-like curvature 59 engaging a flanged trip knob 60, and at the opposite end are fastened to each stationary arcing contact 57. As the description proceeds, it will become apparent that, although this is a preferred arrangement for providing a restraining means for the axially slidable plunger rod 38, other resilient restraining members may be used for normally restraining the actuator 20 from axial lengthwise movement, until such movement is desired.

The trip knob is provided with a threaded stud portion for engaging one end of an insulating follower member 61, although it is conceivable that the follower member may be provided with an annular groove (not shown) as a restraining stop engaging the leaf springs, if so desired. However, the present arrangement permits a design wherein the component parts may be easily maintained, and which parts may withstand the utmost in use and operation.

The follower member 61 is preferably provided of horn fibre, which is a well-known material having the characteristic of providing copious quantities of arc-extinguishing, un-ionized gases in the presence of an electrical arc. It is within the province of this invention, however, to provide any arc-extinguishing or cooling material, if so desired. It will also be understood with reference to Fig. 6 that the liner 45a of the insulating housing 28 may be of horn fibre and the follower 61a of Lucite, if such arrangement is desired; but the arrangement shown in Fig. 3 has been found to be best for efficient operation.

Referring again to Fig. 3, the follower member 61 is preferably threaded on the plunger rod 38, and engages, at its opposite end, the movable arcing contact 62, which is normally in electrical engagement with the stationary arcing contacts 57. The movable arcing contact is preferably provided with a recessed portion 63 as a means of permitting any arc to be moved to the recessed area and minimize pitting at the contact area. The movable contact 62 is also threadingly engaged with one end of the plunger rod 38, and is preferably separated from the closure member 36 by means of an insulating washer 64, which is of reduced diameter and provides a cushion therefore.

It is to be noted that it is an important feature of this invention that the interrupter unit is entirely self-contained, except for the external auxiliary contact spring 9 fastened to the switch terminal 2. No other operating or resetting mechanism is required, nor desired. All of the operating and resetting components are entirely contained within the confines of the loadbreak unit 8. It is further to be noted that very little, if any, stress is normally set up in any of the biasing means needed for effective operation and resetting of the device. Each of the spring members are normally in low stress, or inactive, position, until the switch blades 4 are motivated towards open position, as will hereinafter be described. The actuating member 20 comprising the various axially movable portions is normally at rest with the one end of the leaf springs 58 normally in relaxed position to urge the stationary contacts 57 towards electrical engagement with the movable contact 62.

The operation of the automatically resetting load interrupter unit will now be described with particular reference to Figs. 1 through 5. It will be assumed, for purposes of explanation, that the disconnect switch 1 is initially in closed circuit position, denoted by the dot-dash line A of Fig. 2, with the switch blades 4 engaging the jaw contacts 7 of the terminal 2. This position is shown in Fig. 1, and also relates to the arrangement of the component parts of the interrupter 8, as viewed in Fig. 3. Thus, the disconnect switch 1 and the auxiliary loadbreak unit 8 provide a parallel electrical circuit when the switch blades are in normally closed position. The auxiliary circuit through the interrupter may be traced from the auxiliary contact spring 9 electrically connected to the terminal 2 of the switch through the conducting contact knob 19 to the conducting tube 38 threadingly engaged therewith. The auxiliary circuit continues from the tube to the closure member 36 and also through the slidable conducting plunger rod electrically engageable with the tube. The circuit is established from the plunger rod 38 to the movable contact 62, and thus to the stationary contacts 57 connected to the leaf springs to the conducting muffler 55. From the muffler 55 the circuit is continued by contact of the muffler with the closed end of the vented lower cap member 30, and thus to the collar 50 threadingly engaged with the conducting ferrule 25. The circuit is then completed through the conducting shaft 21 to the switch blades 4.

When it is desired to disengage the switch blades 4 from the contacts 7, a hook or switch stick (not shown) is inserted in the manipulating eyelet 6. Assuming that the switch is to be opened under load conditions, the blade may be moved outwardly from the jaw contacts without destructive arcing conditions resulting from such separation, as the entire load will be momentarily received by the auxiliary parallel circuit established through the loadbreak unit 8. The position of the switch blades 4, denoted by the dot-dash line B of Fig. 2, as shown in full lines, is comparable to Fig. 4, illustrating in section, the arrangement and relative position of the various components of the unit 8 when the unit is moved by the switch blades to the position shown in Fig. 2. It will be noted that the contact knob 19 of the unit remains in embracing engagement between the spaced contact arms 12 of the spring contact 9 as the unit is rotated clockwise, as viewed in Fig. 2, during opening operation. The contact knob is reasonably free to slide longitudinally of the arms 12, but is stopped from lateral movement by the flange 42 engaging the arms, until sufficient force is extended thereon to free the members from one another.

It will thus be apparent that continued opening movement of the switch blades withdraws the tube 35 from the bore of the insulating housing 28. This endwise axial movement of the tube causes the closure member 36, fastened to the tube, to press against the compression spring 39 to cause that spring to be placed in loaded position, as shown in Fig. 4. The opposite end of the spring 39 abuts the flanged portion 41 of the plunger rod 38, tending to force the rod towards release from the restraining means comprising the trip knob 60 and curvature 59 on the leaf springs 58. It is to be noted that the closure member 36 is freely slidable on the rod 38 and that the flanged portion 41 of the rod is also slidable within the bore of the conducting tube 35.

With the parts as shown in line B of Fig. 2 and in Fig. 4, any further movement of the switch blades 4, as reflected in the endwise movement of the tube 35 of the loadbreak unit, will cause the trip knob 60 to wedgingly force the hump-like curvature 59 of the leaf spring 58 outwardly to release the plunger rod 35 in a quick lengthwise axial movement responsive to the force exerted by the previously loaded compression spring 39. The plunger rod will then take its original position, as shown in Fig. 5, with the flanged portion 41 cushioned against the recoil spring 42, and with the arcing contacts 57 and 62 being fully separated from one another. The follower member 61 will simultaneously be disposed between the stationary contacts 57. The rapid separating movement of the arcing contacts and simultaneous creation of arc-extinguishing, un-ionized gases on contacts of arc with the liner 45 and follower 61 will cause any arcs to be extended, cooled and extinguished, with the gases being expelled through the vent openings 56 of the muffler 55 and the vent openings 31 of the lower vented cap member 30, and thus to atmosphere.

Once again, it is to be noted in Fig. 5 that the contact knob 19 is still retained by the contact arm 12, although the arcing contacts within the tube have been fully separated to completely interrupt the circuit. It will also be noted in Fig. 5 that the flanged portion 37 of the closure member 36 engages the lower end of the resetting hammer 47. Continued movement of the switch blade 4 in a counterclockwise direction, as viewed in Fig. 2, and with the contact knob 19 still remaining within the confines of the contact arms 12, will cause the compression reset spring 48 to be loaded. When the parts of the interrupter unit can no longer be moved longitudinally relative to one another, a continued pull on the switch blades 4 will eventually cause the contact knob 19 to leave the resilient contact arms 12 with a very rapid snap action. Movement of the blade to the dash-dot line C of Fig. 2 will cause release of the hammer, which is biased towards endwise movement within the loadbreak unit by the fully stressed compression spring 48, to reset the tube 35, the plunger rod 38, and follower 61 in normal operating position, as shown in Fig. 3. The trip knob 60 engages the hump-like portion 59 of the leaf springs 58, with all component parts being reset for another cycle of operation.

After the contact knob 19 is released from the spring arms 12, the torsion springs 22 will cause the entire loadbreak unit to pivot about its axis and rest between the blades 4, seated in the opposed cradle members 26 and 27. It is to be noted that the unit has been reset for operation while the switch blade is completely free from contact with the terminal contact 7.

The cap members 13 on each extremity of the contact arms 12 provide an additional stop means for retaining the contact knob 19 between the arms 12, until full loading of each compression spring is assured. The members 13 may also be an integral part of the arms 12 if so desired.

If desired, the members 13 may be of insulating material where it is desired to prevent contact of the interrupter unit during closing operation with the auxiliary contacts 9, until the switch blades have been seated properly in the jaw contact 7.

Figure 9:
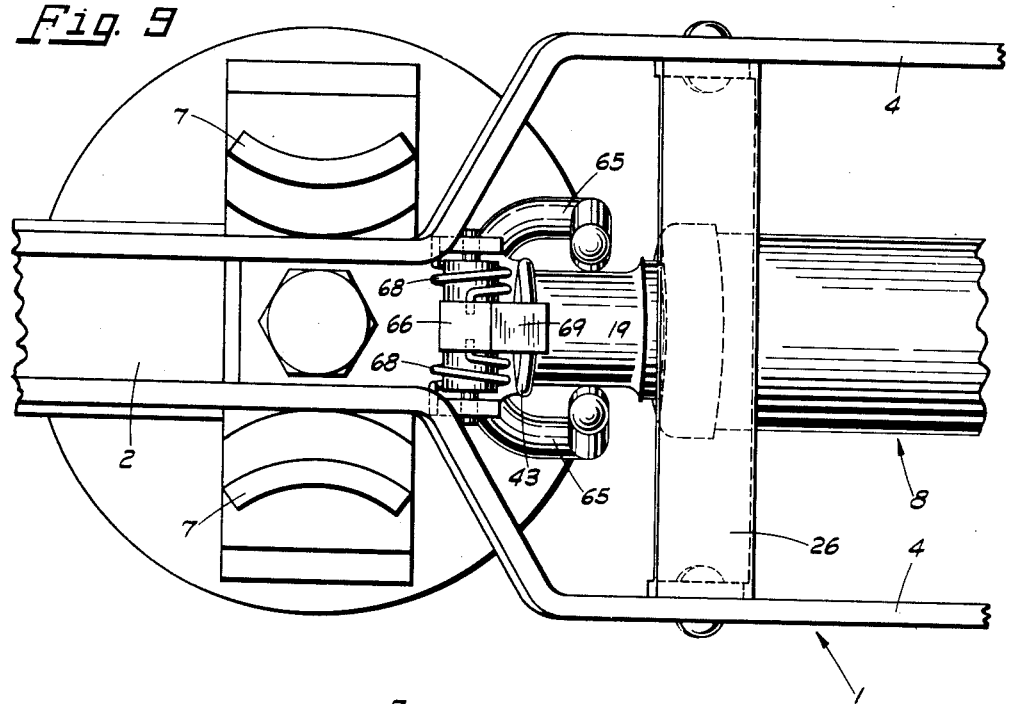
Fig. 9 is a fragmentary plan view of the releasable contact portion of a disconnect switch having the interrupter unit mounted thereon and especially illustrating another embodiment of the auxiliary stationary contact structure.
Figure 10:
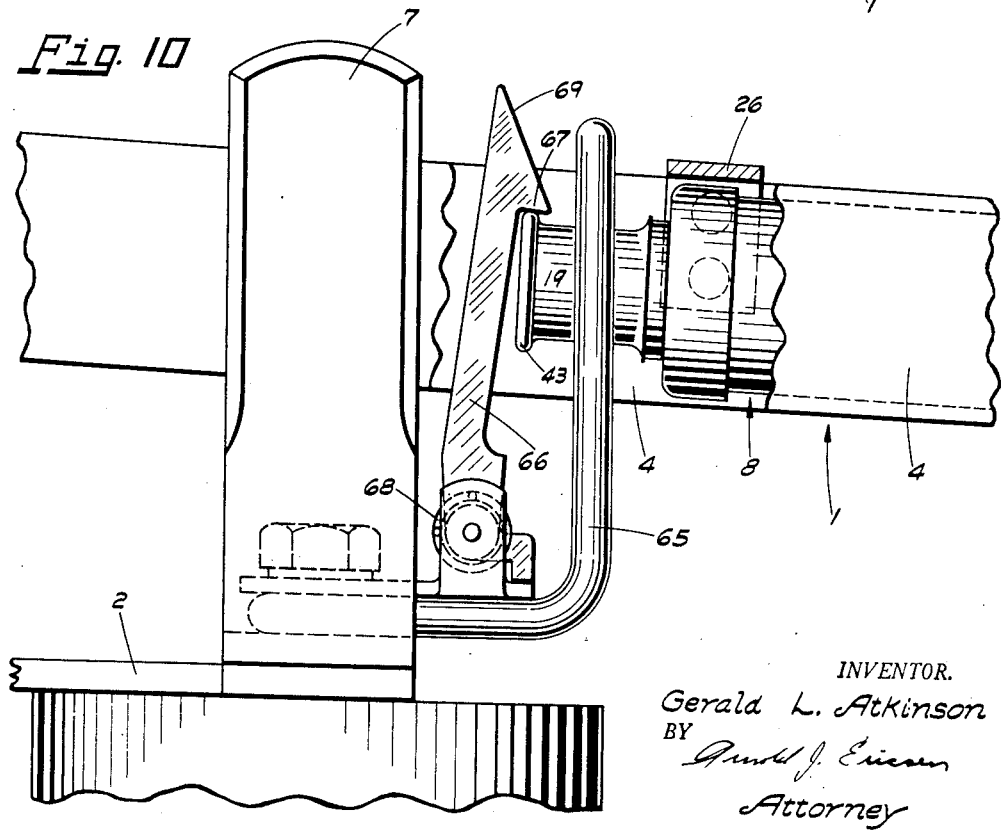
Fig. 10 is a fragmentary side elevational view of the embodiment of Fig. 9.

The embodiment of Figs. 9 and 10 illustrates another latching arrangement for maintaining positive contact engagement of the interrupter unit 8 and its auxiliary spring contacts 9, having opposed arms 65 arranged for embracing electrical engagement of the contact knob 19. The arms 65 are bent outwardly at the free ends thereof to guide the knob into proper seating engagement therebetween. A latch member 66 having a detent portion 67 is pivotally supported by the auxiliary contact and is biased towards clockwise rotational movement, as viewed in Fig. 10, by the torsion springs 68. The detent portion of the latch member 66 is also provided with an inclined surface 69 for permitting the flange 43 of the knob 19 to ride thereon during closing operation.

The positive latching action will be apparent from Figs. 9 and 10, wherein the operating members are shown in latch position with the parallel electrical circuit being established similar to the arrangement of components shown in Fig. 1. On opening action of the switch blades (not shown), the contact knob 19 will remain in engagement with the auxiliary contact arms 65 without any possibility of the interrupter becoming disengaged from the terminal 2 until such is desired. That is, in the embodiment of Figs. 9 and 10, both proper interruption of the arcing contacts and proper loading of the resetting hammer will be assured for positive operation of the unit. It will be apparent, however, that the first-described embodiment is entirely operable, but at the same time is dependent for its holding action upon surfaces subject to wear on continued use.

Figure 11:
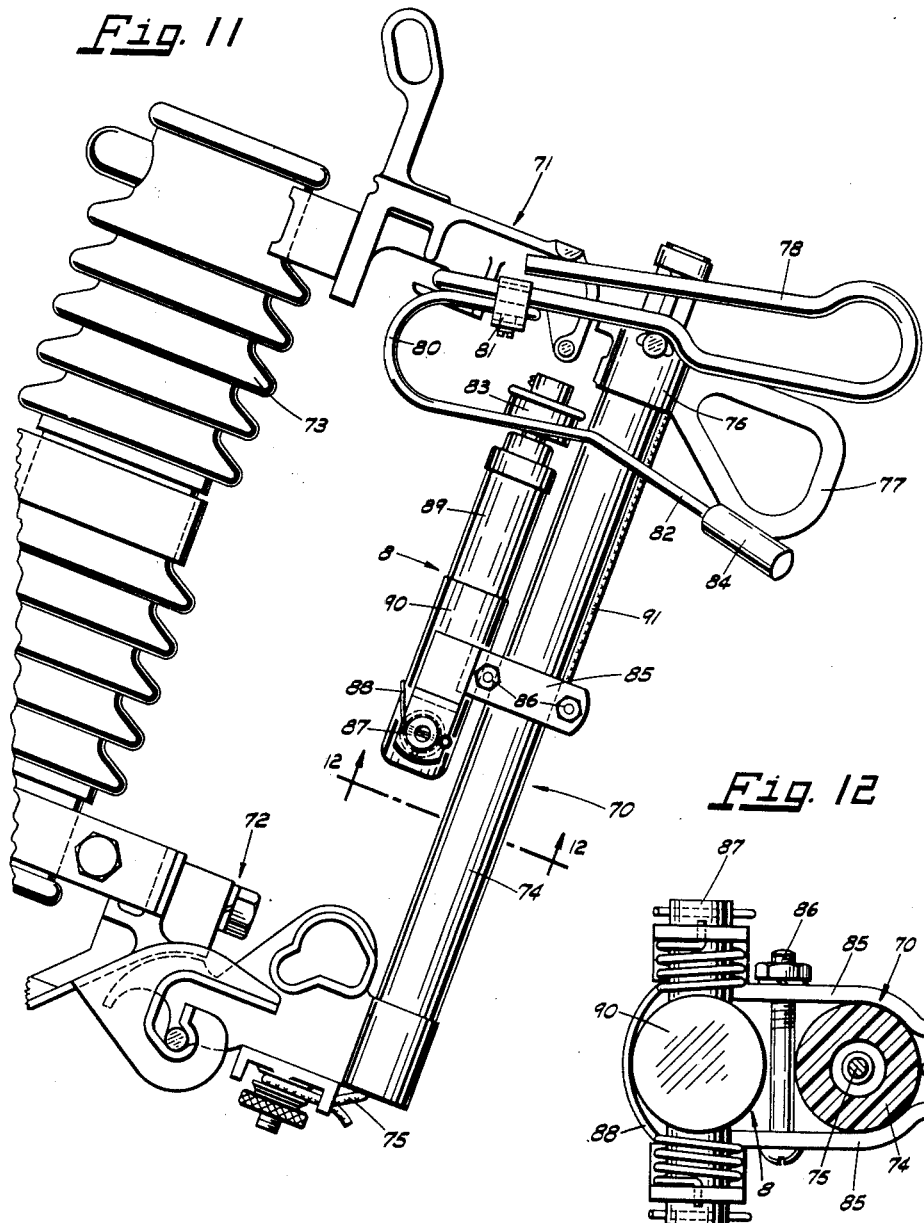
Fig. 11 is a side elevational view of the interrupter unit mounted on a conventional open-type fuse cutout.
Figure 12:
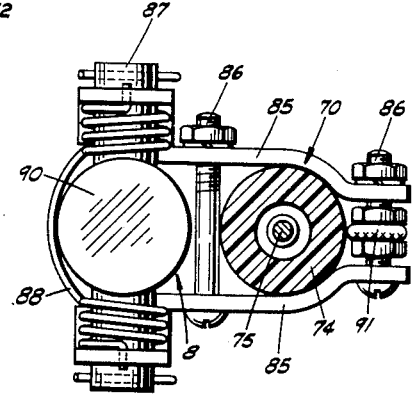
Fig. 12 is a bottom view of the loadbreak unit and fuse tube taken on lines 12—12 of Fig. 11.

The novel interrupter unit may be adapted for use with various types of circuit makers or breakers, and another embodiment is shown in use with a conventional open-type fuse cutout, as illustrated in Figs. 11 and 12. The operating components of the interrupter are substantially identical in the unit when used in either a switch or a fuse cutout.

The interrupter unit 8 may be conveniently mounted adjacent the expulsion tube of a conventional open-type fuse cutout, denoted generally by the reference character 70. The cutout comprises an upper and lower terminal 71 and 72, respectively. The terminals are mounted in spaced relationship on an insulating bushing member 73, and connection with an electrical line is made in the conventional manner at these terminals (not shown). The terminals are bridged by a conventional expulsion tube 74, which may be pivoted from the lower terminal 72 and releasably electrically engages the upper terminal 71. The circuit is completed within the expulsion tube 74 by means of a conventional fuse link 75, the leader of which is shown here extending from the bottom of the fuse tube and fastened to the lower terminal member 72. Contact between the fuse link and the outer conducting ferrule 76 is made internally of the tube to thus complete the circuit. A manipulating eyelet 77 is provided as a convenient means for opening and closing the expulsion tube from and to positive engagement with the upper contact member 78.

Very little modification of a conventional open-type cutout is required for positioning the load interrupter thereon. An auxiliary spring contact member 80 is electrically connected to the upper terminal by means of a conventional connector means 81. The auxiliary contact 80 is of a general U-shape having laterally extending contact arms 82 in embracing electrical engagement with the contact knob 83 of the interrupter 8 and being formed at the outer ends thereof to freely slidably receive the expulsion tube 74 of the fuse cutout. Cap members 84 are provided as additional stop portions for the extremities of the contact arms 82.

The self-contained unit 8 may be mounted on the expulsion tube by means of L-shaped bracket members 85 spaced from one another and positioned at either side of the expulsion tube and fastened together by means of conventional bolt and nut assemblies 86. The interrupter unit is pivoted from the bracket at the pivot point 87 and urged towards clockwise movement, as shown in Fig. 9, by the torsion springs 88. The interrupter unit is slightly modified by the placement of the pivot point in a manner that will clear the various parts, however, the internal operating components are substantially identical to those described in connection with the unit shown in Figs. 1 and 2. In general, the loadbreak interrupter unit 8 comprises the insulating tube 89 fastened to the lower vented cap member 90.

In order to complete the auxiliary circuit through the various components of the interrupter unit the cutout must be slightly modified to electrically connect the unit with the conducting ferrule 76 engageable with the spring contact 78. This is conveniently accomplished by bridging the ferrule with the conducting bracket 85 by means of a conductor 91. The conductor may be insulated if so desired.

It will be apparent that two parallel current paths are established when the cutout is closed as shown in Fig. 11. The first path is through the members designated by the reference numerals 71, 78, 76, 75 and 72. The second path is through the members designated by the numerals 71, 82, 83, 8, 85, 91, 76, 75 and 72. The interrupter 8 remains in series circuit with the fuse 75 at all times.

The internal operating components comprising the interrupter 8 may be referred to with reference to Figs. 3, 4 and 5, as they operate in substantially an identical manner. Thus, when it is desired to open the fuse cutout under load conditions, a hook or switch stick (not shown) is inserted in the manipulating eyelet 77, and the fuse tube 74 is caused to pivot about the lower terminal 72, in a clockwise direction as viewed in Fig. 11. When the cutout has been opened to a position wherein the conducting ferrule has been electrically disengaged from the spring contact 78 (not shown), only the second-mentioned current path will remain in circuit. That is, the path through the members bearing the numerals 71, 82, 83, 8, 85, 91, 76, 75 and 72. Continued outward movement of the fuse tube will cause the operating components of the loadbreak unit to be stressed towards disengagement of the arcing contacts within the interrupter just as was described in connection with the first embodiment. The arcing contacts will first be caused to separate with the knob 83 retained in position between the contact arms 82. Further movement of the fuse tube will load the reset spring to bias position. A continued pull on the manipulating eyelet 77 will eventually cause the knob 83 to quickly separate from the contact arms 82 and permit the reset spring to force all of the operating parts back into normal reset position. The fuse link, within the tube, will remain intact during this opening operation and any arcs created during separation of the tube from the upper terminal will be confined to the interrupter unit where they will be properly cooled and extinguished.

Closing operation of the fuse cutout may be made in the conventional manner by simply rocking the fuse tube about the lower terminal 72 in a counterclockwise direction, as viewed in Fig. 9, to rest in the position shown in that figure with the interrupter seated between the contact arms 82 and the fuse tube again in positive electrical engagement with the upper contacts 78.

I claim:

1. In an electrical circuit breaker including a stationary contact member and a movable contact member normally releasably electrically engaging one another; a load interrupter electrically connected to said movable contact member, said interrupter comprising separable arcing contacts, conducting actuator means for separating said arcing contacts and electrically and mechanically engageable with said stationary contact member, a first biasing means normally inactive and arranged to impart energy, when stressed, to said actuator for separating said arcing contacts subsequent to electrical disengagement of said circuit breaker contact members, a second biasing means normally inactive and arranged to impart energy to reset said arcing contacts in normal electrically engaged position, and means for stressing said first and second biasing means responsive to circuit opening movement of said movable contact member.

2. In an electrical circuit breaker including a stationary contact member and a movable contact member normally releasably electrically engaging one another; a load interrupter electrically connected to and positioned on said movable contact member, said interrupter comprising a housing having a chamber, a conducting closure member for said housing, said closure member being electrically connected with said movable contact member, a stationary arcing contact in said chamber in electrical connection with said closure member, a movable arcing contact normally in electrical engagement with said stationary arcing contact, conducting actuator means mechanically and electrically connected to said movable arcing contact and further electrically and mechanically engageable with said stationary contact member, biasing means normally inactive and arranged to impart energy, when stressed, to said actuator for disengaging said arcing contacts subsequent to electrical disengagement of said circuit breaker contact members and to subsequently reset said arcing contacts in normal electrically engaged position, and means for stressing said biasing means responsive to circuit opening movement of said movable contact member.

3. In an electrical circuit breaker including a stationary contact member and a movable contact member normally releasably electrically engaging one another; a load interrupter electrically connected to said movable contact member, and comprising a housing having an insulating chamber, a conducting closure member for said housing and in electrical connection with said movable contact member, a conducting slidable plunger in said chamber and normally electrically connected with said stationary contact member, a movable arcing contact on said plunger, a stationary arcing contact in electrical connection with said closure member and in normal electrical engagement with said movable arcing contact, an actuator slidable relative to said plunger, normally inactive biasing means operatively joining said plunger and said actuator and arranged to be stressed on relative motion thereof, an insulating member concurrently movable with said plunger and arranged to be interposed between said arcing contacts on disengagement thereof, said biasing means, when stressed, being arranged to impart energy to said actuator for separating said arcing contacts subsequent to electrical disengagement of said circuit breaker contact members, a second normally inactive biasing means arranged to reset said arcing contacts in normal electrically engaged position, and means for stressing both of said biasing means responsive to circuit opening movement of said movable contact member.

4. In an electrical circuit breaker including a stationary contact member and a movable contact member normally releasably electrically engaging one another; a load interrupter electrically connected to and positioned on said movable contact member, said interrupter comprising a housing having an insulating chamber, a conducting closure member for said housing and in electrical connection with said movable contact member, a conducting slidable plunger in said chamber and normally electrically connected with said stationary contact member, a movable arcing contact on said plunger, a stationary arcing contact in electrical connection with said closure member and in normal electrical engagement with said movable arcing contact, an actuator slidable relative to said plunger, normally inactive biasing means operatively joining said plunger and said actuator and arranged to be stressed on relative motion thereof, an insulating member concurrently movable with said plunger and arranged to be interposed between said arcing contacts on disengagement thereof, releasable retaining means normally holding said arcing contacts in electrical engagement with one another, said biasing means, when stressed, being arranged to impart energy to said actuator for separating said arcing contacts from one another with a quick-break action and to release said retaining means subsequent to electrical disengagement of said circuit breaker contact members, a second normally inactive biasing means arranged to reset said arcing contacts in normal electrically engaged position, and means for stressing both of said biasing means responsive to circuit opening movement of said movable contact member.

5. In an electrical circuit breaker including a stationary contact member and a movable contact member normally releasably electrically engaging one another; an auxiliary spring contact on said stationary contact member, a load interrupter electrically connected to and positioned on said movable contact member, and comprising separable arcing contacts, conducting actuator means for separating said arcing contacts and having a contact portion electrically and mechanically engageable with said auxiliary spring contact, said auxiliary spring contact comprising a pair of resilient arms normally yieldingly seizing the contact portion of said actuator means therebetween, said arms being biased in a direction towards one another and being adapted to release said contact portion on predetermined circuit opening movement of said circuit breaker movable contact member, a first biasing means normally inactive and arranged to impart energy, when stressed, to said actuator for separating said arcing contacts subsequent to electrical disengagement of said circuit breaker contact members, and a second biasing means arranged to reset said arcing contacts in normal electrically engaged position, and means for stressing each of said biasing means responsive to circuit opening movement of said movable contact member.

6. In an electrical circuit breaker including a stationary contact member and a movable contact member normally releasably electrically engaging one another; an auxiliary spring contact on said stationary contact member, a load interrupter electrically connected to and positioned on said movable contact member, and comprising separable arcing contacts, a conducting actuator member for separating said arcing contacts and having a flanged contact portion electrically and mechanically engageable with said auxiliary spring contact, said auxiliary spring contact comprising a pair of resilient arms normally yieldingly seizing the contact portion of said actuator means therebetween, said arms being biased in a direction towards one another and being adapted to release said contact portion on predetermined circuit opening movement of said circuit breaker movable contact member, and a pivoted latch member operatively associated with said auxiliary spring contact and having a detent portion releasably engageable with the flange of said contact portion on said actuator member, biasing means normally inactive and arranged to impart energy, when stressed, to said actuator for separating said arcing contacts subsequent to electrical disengagement of said circuit breaker contact members and to subsequently reset said arcing contacts in normal electrically engaged position, and means for stressing said biasing means responsive to circuit opening movement of said movable contact member.

7. In an electrical circuit breaker including a stationary contact member and a movable contact member normally releasably electrically engaging one another; a load interrupter electrically connected to said movable contact member, said interrupter comprising a tubular housing having an insulating bore, separable arcing contacts within said bore, a movable insulating member, conducting actuator means for separating said arcing contacts and interposing said insulating member therebetween, said actuator means electrically and mechanically engageable with said stationary contact member, the surface of said insulating bore of said housing including horn fibre material and the outer surface of said movable insulating member comprising a polymerized acrylic material, biasing means normally inactive and arranged to impart energy to said actuator for separating said arcing contacts subsequent to electrical disengagement of said circuit breaker contact members and to subsequently reset said arcing contacts in normal electrically engaged position, and means for stressing said biasing means responsive to circuit opening movement of said movable contact member.

8. In an electrical circuit breaker including a stationary contact member and a movable contact member normally releasably electrically engaging one another; a load interrupter electrically connected to said movable contact member, said interrupter comprising a tubular housing having an insulating bore, separable arcing contacts within said bore, a movable insulating member, conducting actuator means for separating said arcing contacts and interposing said insulating member therebetween, said actuator means electrically and mechanically engageable with said stationary contact member, the surface of said insulating bore of said housing comprising a polymerized acrylic material and the outer surface of said movable insulating member comprising horn fibre material, biasing means normally inactive and arranged to impart energy to said actuator for separating said arcing contacts subsequent to electrical disengagement of said circuit breaker contact members and to subsequently reset said arcing contacts in normal electrically engaged position, and means for stressing said biasing means responsive to circuit opening movement of said movable contact member.

9. An auxiliary load interrupter for a disconnect switch having a pair of spaced apart terminals and a switch blade pivotally mounted on one of said terminals and releasably engageable with the other of said terminals, said interrupter comprising separable arcing contacts, conducting actuator means for separating said arcing contacts, biasing means normally inactive and arranged to impart energy, when stressed, to said actuator for separating said arcing contacts subsequent to disengagement of said switch blade from said other terminal and to subsequently reset said arcing contacts in normal electrically engaged position, and means for stressing said biasing means responsive to disengaging operation of said switch blade.

10. An auxiliary load interrupter for an electrical fuse device having a pair of spaced apart terminals and a fuse cartridge pivotally positioned on one of said terminals and mechanically engageable with the other of said terminals and having a fusible element for connecting and disconnecting said terminals, said interrupter comprising separable arcing contacts, conducting actuator means for separating said arcing contacts, biasing means normally inactive and arranged to impart energy when stressed to said actuator for separating said arcing contacts subsequent to mechanical disengagement of said cartridge from said other terminal and to subsequently reset said arcing contacts in normal electrically engaged position, and means for stressing said biasing means responsive to disengaging operation of said cartridge.

11. An auxiliary load interrupter for an electrical fuse device having a pair of spaced apart terminals and a fuse cartridge pivotally positioned on one of said terminals and mechanically engageable with the other of said terminals and having a fusible element for connecting and disconnecting said terminals, said interrupter comprising a housing having a chamber, a conducting closure member for said housing and in electrical connection with said fusible element, a stationary arcing contact in said chamber and in electrical connection with said closure member, a movable arcing contact normally in electrical engagement with said stationary arcing contact, conducting actuator means mechanically and electrically connected to said movable arcing contact and further electrically and mechanically engageable with the other of said terminals, an insulating member concurrently movable with said movable arcing contact and arranged to be interposed between said arcing contacts on disengagement thereof, a first biasing means normally inactive and arranged to impart energy when stressed to said actuator for separating said arcing contacts subsequently to mechanical disengagement of said cartridge from said other terminal, a second biasing means arranged to reset said arcing contacts in normal electrically engaged position, and means for stressing each of said biasing means responsive to disengaging operation of said cartridge.

12. A load interrupter for a circuit breaker including a stationary contact member and a movable contact member normally releasably electrically engaging one another, said interrupter comprising a tubular insulating housing having a bore, separable arcing contacts contained within said bore, a concentric conducting sleeve in said bore movable axially relative to said housing, a conducting closure member on one end of said sleeve and extending outwardly from said housing, said closure member arranged to mechanically and electrically, releasably engage said circuit breaker stationary contact member, a conducting plunger member contained within the bore of said sleeve and axially movable relative therewith, said plunger including one of said arcing contacts at one end thereof, a concentric, normally unloaded, coil spring in the bore of said sleeve and circumjacent to said plunger, said spring arranged to be compressed on relative axial movement of said sleeve and said plunger, restraining means for said plunger normally resisting said relative axial movement between said plunger and said sleeve, a reset hammer in the bore of said housing, a second normally unloaded coil spring circumjacent to said sleeve and engageable with said hammer, said second spring being arranged to be loaded on continued axial movement of said sleeve relative to said housing for imparting motion to said hammer for resetting said interrupter on release of said plunger and said separable contacts from said restraining means.

References Cited in the file of this patent
UNITED STATES PATENTS

| | | |
|---|---|---|
| 2,239,224 | Goldner | Apr. 22, 1941 |
| 2,337,889 | Harlow et al. | Dec. 28, 1943 |
| 2,344,113 | Schultz | Mar. 14, 1944 |
| 2,434,315 | Froland | Jan. 13, 1948 |